(12) United States Patent
Och et al.

(10) Patent No.: US 11,878,626 B2
(45) Date of Patent: Jan. 23, 2024

(54) LIGHTING MODULE FOR A VEHICLE COMPONENT AND VEHICLE COMPONENT WITH A LIGHTING MODULE

(71) Applicant: ILLINOIS TOOL WORKS INC., Glenview, IL (US)

(72) Inventors: Roland Och, Rottendorf (DE); Joachim Oberst, Grossrinderfeld (DE); Andreas Rudolf, Eibelstadt (DE); Matthias Hegwein, Ippesheim (DE); Matthias Gans, Aub (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/551,663

(22) Filed: Dec. 15, 2021

(65) Prior Publication Data
US 2022/0185173 A1    Jun. 16, 2022

(30) Foreign Application Priority Data

Dec. 15, 2020    (DE) ...................... 10 2020 133 499.0

(51) Int. Cl.
*B60Q 3/30* (2017.01)
*B60Q 1/26* (2006.01)
*F21V 8/00* (2006.01)

(52) U.S. Cl.
CPC ............. *B60Q 1/2661* (2013.01); *B60Q 3/30* (2017.02); *G02B 6/001* (2013.01)

(58) Field of Classification Search
CPC ...... B60Q 1/2661; B60Q 1/2669; B60Q 3/30; B60Q 1/543
See application file for complete search history.

(56) References Cited

U.S. PATENT DOCUMENTS 7,188,981 B2 * 3/2007 Rodriguez Barros ...................... B60Q 1/2665
362/545
9,590,435 B2   3/2017 Woo
(Continued)

FOREIGN PATENT DOCUMENTS

DE    102011108817 A1    8/2012
DE    202014102935 U1    7/2014
(Continued)

OTHER PUBLICATIONS

Admitted Prior Art: Lighting Module Images; 1 page.

*Primary Examiner* — Julie A Bannan
(74) *Attorney, Agent, or Firm* — THOMPSON HINE LLP

(57) ABSTRACT

An illumination module (1) for highlighting a region of a vehicle component, such as a charging or tank recess (20) or a handle assembly, includes a light source support (2) having at least one light source (3) and a housing (4), in which the light source support with the at least one light source is received. The housing includes a light outlet region (5), via which light can be decoupled from the housing (4). The illumination module (1) further includes a light diffuser (6) optically coupled to the light outlet region of the housing, which diffuser includes a first light outlet region (7), via which light can be decoupled for direct illumination or highlighting of the region of the vehicle component and which includes a second light outlet region (8), which is spatially separated from the first light outlet region (7) via which signal light can be decoupled.

14 Claims, 7 Drawing Sheets

(56) References Cited

U.S. PATENT DOCUMENTS

| | | | |
|---|---|---|---|
| 10,589,672 B1* | 3/2020 | Chakrapani | E05B 81/77 |
| 2003/0081401 A1* | 5/2003 | Camarota | A47K 3/003 |
| | | | 362/337 |
| 2005/0219854 A1* | 10/2005 | Grady | B60Q 3/267 |
| | | | 362/490 |
| 2012/0212967 A1 | 8/2012 | Sawayanagi | |
| 2015/0138800 A1* | 5/2015 | Salter | B60Q 3/217 |
| | | | 362/510 |
| 2016/0297352 A1 | 10/2016 | Takahashi | |
| 2019/0381905 A1 | 12/2019 | Winkler | |

FOREIGN PATENT DOCUMENTS

| | | |
|---|---|---|
| DE | 202014102936 U1 | 7/2014 |
| DE | 102013112835 A1 | 5/2015 |
| DE | 102016200393 A1 | 8/2016 |
| DE | 102017202113 B3 | 1/2018 |
| DE | 102017210946 A1 | 1/2019 |
| DE | 102017213369 A1 | 2/2019 |
| DE | 102018209848 A1 | 1/2020 |
| WO | WO-2021071704 A1 | 4/2021 |

* cited by examiner

LIGHTING MODULE FOR A VEHICLE COMPONENT AND VEHICLE COMPONENT WITH A LIGHTING MODULE

TECHNICAL FIELD

The present invention relates generally to lighting/illumination modules for illuminating, in particular optionally or as needed, and in particular highlighting a region of a vehicle component, in particular a region of a charging or tank recess or a handle assembly.

The invention further relates to a vehicle component having such an illumination module.

The vehicle component considered herein is, in particular, a charging or tank recess of a vehicle. Alternatively, however, it is also conceivable to use the illumination module according to the invention on another vehicle component, for example on a handle assembly of a vehicle.

BACKGROUND

Vehicles having a hybrid or electric drive have at least one battery or traction battery, which, for example in the case of PHEV vehicles (PHEV=plug-in hybrid electric vehicle) or BEV vehicles (BEV=battery electric vehicle), can be charged via an electrical charging connector that is accessible from the outside on the vehicle body, and is typically a charging socket, by connecting to an electrical charging station, for example, or a conventional home electrical terminal.

The charging connector is usually disposed in a charging recess of the vehicle body, which is generally covered or closed by a closure element. A mechanism that cooperates with the closure element optionally allows the charging recess to be opened and closed or the closure element to be flipped open and closed relative to the charging recess, and thus allows access to the charging connector.

For example, the mechanism can include a so-called push-push kinematics, as is already used in conventional fuel caps. Because, when such a mechanism is used in practice, a seal between the closure element and the charging recess is usually lacking, which would be necessary, however, in order to protect the electrical charging port including metallic contacts against the ingress of dirt, dust, and liquids, in particular water, and thus ensure its permanent functionality, an additional tailgate is currently required, which is inserted or screwed onto the charging port in order to protect the charging port.

By contrast to internal combustion engine vehicles, which are typically filled with fuel at gas stations where the fueling operation occurs either during the day or in an illuminated environment, the charging operation often occurs in the dark in vehicles having a hybrid or electric drive. For example, it is common for a vehicle having a hybrid or electric drive to be recharged in a dark, non-illuminated, underground parking lot. In this case, it is extremely advantageous for the driver to be facilitated with proper illumination in order to locate the charging connector in the charging recess.

For this purpose, it is known to provide illumination in the charging recess. It can also be provided that light sources are arranged around the charging connector in the charging recess in order to identify the charging connector.

For example, in DE 10 2011 108 817 A1, a charging device for an electric vehicle is described, in which segment-like light sources are lined up around the charging connector in the charging recess in such a way that they form a closed rim around the charging connector. On the one hand, the light sources serve to illuminate the charging connector and, on the other hand, they provide a type of scaling that can be used in order to display the state of charge of a battery of the electric vehicle.

However, due to the large and direct radiation of the light for illuminating the charging connector, an operator can be bothered by a glare. In particular, however, the illumination known from this prior art requires a large amount of design space and a correspondingly high number of light sources.

SUMMARY

It is a problem addressed by the present invention to provide a reliably manageable charging device for a hybrid or electric vehicle. Furthermore, a correspondingly reliably manageable tank device for a vehicle having an internal combustion engine is to be provided.

In particular, it is a problem addressed by the invention to provide a charging or tank recess for insertion in a body opening of a motor vehicle that is simple to set up and therefore inexpensive to manufacture, wherein the operation of a charging or tank device having such a charging or tank recess is simultaneously simplified.

A further problem addressed by the invention can be seen in providing a general solution for simplifying and improving the operation of vehicle components, for example a charging or tank recess or a handle assembly of a vehicle.

This problem is in particular solved by an illumination module for illuminating, in particular optionally or as needed, and in particular highlighting of a region of a charging or tank recess according to the independent claim 1.

However, the illumination module according to the invention, as specified in independent claim 1, is also suitable for illuminating, in particular optionally or as needed, and in particular highlighting a region of another vehicle component, for example a handle assembly of a vehicle. Accordingly, the invention is not limited to charging or tank recesses having the illumination module according to the invention, but rather relates generally to illumination modules for different vehicle components.

The illumination module according to the invention is characterized by a compact design, which allows the illumination module to be used for optional or as-needed illumination or highlighting for different vehicle components. In particular, the illumination module has a modular construction, so that the illumination module can be used for different designs of the vehicle component to be illuminated.

The illumination module according to the invention comprises in particular a light source support having at least one light source, preferably in the form of an LED. This light source support is preferably a printed circuit board.

Additionally, the illumination module comprises a housing in which the light source support with the at least one light source is at least regionally received or receivable. The housing of the illumination module is in particular characterized in that it comprises a (and preferably a single) light outlet region via which light emitted by the at least one light source can be decoupled from the housing.

According to the invention, it is provided in particular that the illumination module comprises a light diffuser that is or can be optically coupled to the light outlet region of the housing. The light diffuser comprises a first light outlet region via which light can be decoupled for preferably direct illumination or highlighting of the region of the vehicle component. Additionally, the light diffuser comprises a second light outlet region, which is in particular spatially separated from the first light outlet region and via which signal light can be decoupled.

The term "signal light" as used herein means, in particular, light that is used for indicating a state, preferably an operating state, in particular of a vehicle component, or for indicating a situation, preferably a hazardous or warning situation.

The invention is based upon the finding that charging or tank recesses on vehicles, for example at poorly lit gas stations or in emergency situations, are in particular poorly or not at all highlighted, so that connecting a charging cable to the electrical charging port or inserting a fuel nozzle into the tank opening is therefore difficult. Furthermore, dirt and moisture that can frequently occur within the space of the tank or charging recess are often not discernible, at least in the dark.

With the aid of the illumination module according to the invention, these problems can be solved, because the illumination module serves on the one hand to highlight the relevant region of the charging or tank recess, namely by decoupling corresponding light for preferably direct illumination or highlighting of the region of the vehicle component from the first light outlet region of the light diffuser.

However, the illumination module according to the invention fulfills a dual function, in particular: on the one hand, the illumination module serves to preferably directly illuminate or highlight the relevant region of the vehicle component. On the other hand, the light diffuser of the illumination module comprises a second light outlet region, which is in particular spatially separated from the first light outlet region and via which signal light can be decoupled.

In other words, with the illumination module according to the invention, an optical signal is decoupled optionally or as needed via the second light outlet region of the light diffuser, for example in order to display a current state of charge. This can be indicated, for example, by the intensity and/or the color of the light decoupled via the second light outlet region of the light diffuser.

Alternatively or additionally, it is conceivable that the expected remaining charging time is indicated via the second light outlet region of the light diffuser.

Alternatively or preferably additionally, the optical signal, which can be decoupled via the second light outlet region of the light diffuser, also comprises a display of an error message and/or a confirmation during the charging process. The error message relates, for example, to the event that the charging plug is not correctly inserted and/or locked, because in this situation the battery of the vehicle cannot be charged. On the other hand, positive information indicating that the charging operation is occurring correctly and/or that the charging plug is correctly locked is also helpful for the user. Any charging interruptions can also be indicated accordingly.

As already mentioned above, the invention is not limited to illumination modules for charging or tank recesses. The illumination module according to the invention is in particular also suitable for illuminating or highlighting, for example, a handle assembly, in particular an interior door handle assembly, of a vehicle.

In this application example, it can also be desired that not only a region of the handle assembly is illuminated or illuminated, but rather that a corresponding signal light is also output via the illumination module, for example, in order to indicate a hazardous or warning situation. This can be the case, for example, if the handle assembly is not to be actuated due to the traffic situation, but the handle assembly or, if necessary, an emergency release of the handle assembly can be indicated to the vehicle occupant via the decoupled signal light.

The illumination module according to the invention, and in particular the light diffuser of the illumination module according to the invention, is preferably designed such that the light decoupled via the first light outlet region of the light diffuser does not bother the operator with a glare but is preferably directly oriented towards the region of the vehicle component that is to be illuminated or highlighted.

On the other hand, the second light outlet region can be in direct visual contact with the user, because the signal light that can be decoupled via the second light outlet region has a significantly lower intensity than the light that is used in order to directly illuminate or highlight the region of the vehicle component, which can be decoupled from the first light outlet region of the light diffuser. The signal light decoupled from the second light outlet region of the light diffuser is diffuse light, in particular.

According to a conceivable realization of the illumination module according to the invention, the first light outlet region and/or the second light outlet region of the light diffuser is/are at least regionally [realized] through a transparent or translucent element. For example, the transparent or translucent element can be the region of the light diffuser from which the illuminating or highlighting light or signal light is decoupled.

Preferably, a material surface quality, in particular roughness, of an at least regionally transparent or translucent element associated with the first light outlet region is different from a material surface quality, in particular roughness, of an at least regionally transparent or translucent element associated with the second light outlet region.

Alternatively or additionally, it is provided that, in view of a density and/or number of light-diverting impurities, preferably an at least regionally transparent or translucent element associated with the first light outlet region is different from an at least regionally transparent or translucent element associated with the second light outlet region.

Alternatively or additionally, it can be provided that the first light outlet region and/or the second light outlet region of the light diffuser is/are formed at least regionally by a closed wall and/or by a two-component transition.

Preferably, the first light outlet region and/or the second light outlet region of the light diffuser comprise(s) at least regionally a black translucent surface and/or coating. A monolithic design can thereby be achieved. The black translucent surface and/or coating provides an opaque (black) surface when no light is decoupled from the first or second light outlet regions, respectively.

In order to ensure that the light emitted by the at least one light source and to be coupled into the light diffuser is as homogeneous and/or diffuse as possible in terms of intensity, it is provided according to embodiments of the illumination module according to the invention that at least one light source arranged with respect to the light outlet region of the housing in such a way that the light emitted by the at least one light source can be decoupled via the light outlet region from the housing as scattered light and preferably exclusively as scattered light and in particular as scattered light scattered on at least one interior wall region of the housing.

In this context, it is advantageous that the at least one interior wall region of the housing preferably has a degree of remission of at least 75%, preferably at least 85%, and more preferably at least 90%.

Preferably, the light source support and the housing of the illumination module form a standardized assembly group, wherein only the light diffuser needs to be adapted specifically to the application.

In this context, it lends itself that the light diffuser is or can be optically coupled to the light outlet region of the housing such that the light emitted by the at least one light source can be decoupled from the housing via the light outlet region and coupled into the light diffuser as scattered light and preferably exclusively as scattered light and in particular as scattered light scattered on at least one interior wall region of the housing.

Alternatively or additionally, the light outlet region of the housing can be arranged and/or formed such that the light emitted by the at least one light source can be decoupled from the housing via the light outlet region and preferably coupled into the light diffuser as scattered light and preferably exclusively as scattered light and in particular as scattered light scattered on at least one interior wall region of the housing.

Here, the at least one interior wall region of the housing preferably has a degree of remission of at least 75%, preferably at least 85%, and more preferably at least 90%.

Alternatively or in addition to the aforementioned embodiments of the illumination module according to the invention, it is provided according to a conceivable realization that, in the illumination module according to the invention, the light diffuser comprises an optical diffusion or deflection device, in particular in the form of at least one wall region or in particular having at least one wall region, which device is configured in order to decouple a first portion of the light emitted by the at least one light source and coupled to the light outlet region of the housing into the light diffuser via the first light outlet region of the light diffuser as illumination light for the region of the vehicle component, while a second portion of the light emitted by the at least one light source and coupled at the light outlet region of the housing into the light diffuser is coupled via the second light outlet region of the light diffuser as signal light.

The optical diffusion or deflection device can comprise a plurality of (in particular small) scattering centers, which are arranged and configured in such a way that a part of the light emitted by the at least one light source and coupled to the light outlet region of the housing into the light diffuser is diffused in different directions, thereby producing diffuse light which is in particular decoupled as signal light via the second light outlet region of the light diffuser.

In this context, it is particularly conceivable that the optical diffusion or deflection device scatters the light coupled at the light outlet region of the housing into the light diffuser and decouples it as signal light via the second light outlet region of the light diffuser. By adjusting the angle-based sensitivity of the optical diffusion or deflection device, the intensity or the portion of the light decoupled via the second light outlet region of the light diffuser as signal light can be adjusted.

According to preferred realizations of the last mentioned embodiments of the illumination module according to the invention, it is provided that preferably the first portion and the second portion of the light emitted by the at least one light source and coupled at the light outlet region of the housing into the light diffuser can be determined in advance, wherein the first portion corresponds to a luminous flux, which is in particular greater and preferably at least 50% greater than the luminous flux corresponding to the second portion.

With this measure, it is ensured that the illumination module can be used in order to highlight the region of the vehicle component without causing a glare, while at the same time visual information about the second light outlet region can be clearly and discernibly output to the user.

According to realizations of an illumination module according to the invention, the light diffuser is configured in order to decouple a first portion of the light emitted by the at least one light source and coupled to the light outlet region of the housing into the light diffuser via the first light outlet region of the light diffuser as illumination light for the region of the vehicle component, and to decouple a second portion of the light emitted by the at least one light source and coupled at the light outlet region of the housing into the light diffuser via the second light outlet region of the light diffuser as signal light.

In this context, it can be provided in particular that the first portion of the light emitted by the at least one light source and coupled at the light outlet region of the housing into the light diffuser is a function, in particular, of a radiometric radiation power emitted with the at least one light source at a first solid angle range, and the second portion of the light emitted by the at least one light source and coupled at the light outlet region of the housing into the light diffuser is a function, in particular, of a radiometric radiation power emitted with the at least one light source at a second solid angle range.

The first solid angle range preferably at least partially coincides with the radiating angle of the at least one light source, while the second solid angle range is preferably at least partially outside the radiating angle of the at least one light source.

This embodiment is based upon the finding that most light sources emit different amounts of light in different directions. The direction characteristic of the light source can thus be exploited in order to determine the intensity of the illumination light and the intensity of the signal light.

In this context, it is conceivable, for example, that the light diffuser comprises a body formed in particular from a transparent or translucent material, at least regionally, said body comprising a particularly material-free passageway. Due to the particularly material-free passageway, the light is conducted through the light diffuser for preferably direct illumination or highlighting of the region of the vehicle component, while the signal light is decoupled via the at least one side wall region of the body formed in particular from a transparent or translucent material, in particular for indicating a state, preferably an operating state, in particular of a vehicle component, or for indicating a situation, preferably a hazardous or warning situation, is decoupled.

In this context, it is advantageous that the passageway of the body of the light diffuser is configured in order to conduct preferably a main part of the light emitted by the at least one light source, in particular at least 50% of the light emitted by the at least one light source, to a light outlet region of the light diffuser body.

The size, the material, and/or the cross-sectional shape of the passageway of the body of the light diffuser is preferably adapted to the direction characteristic of the at least one light source.

In preferred realizations of the illumination module according to the invention, it is provided that the light diffuser comprises a body formed in particular from a transparent or translucent material, at least regionally, said body comprising a particularly material-free passageway due to which the light is conducted through the light diffuser for preferably direct illumination or highlighting of the region of the vehicle component and which comprises at least one side wall region via which the signal light is decoupled, in particular for indicating a state, preferably an operating state, in particular of a vehicle component, or for indicating a situation, preferably a hazardous or warning situation. Here, the passageway of the body of the light diffuser is configured in particular in order to conduct preferably a main part of the light emitted by the at least one light source, in particular at least 50% of the light emitted by the at least one light source, to a light outlet region of the light diffuser body.

In further embodiments of this illumination module, it can be provided that the light source support comprises at least a first light source preferably in the form of an LED and at least one second light source preferably in the form of an LED, wherein the at least one first and the at least one second light source are preferably actuable independently of one another.

In this context, it is particularly conceivable that the at least one first light source is preferably arranged and/or aligned with respect to the light outlet region of the housing such that at least a significant part of the light emitted by the at least one first light source is or can be coupled into the passageway of the body of the light diffuser at light outlet region of the housing.

Alternatively or additionally, the at least one second light source can be preferably arranged and/or aligned with respect to the light outlet region of the housing such that at least a significant part of the light emitted by the at least one second light source is or can be coupled into and edge or wall region of the body of the light diffuser at light outlet region of the housing.

According to a further aspect of the present invention, the illumination module comprises a fiber optic assembly having a light inlet region that is or can be optically, in particular also mechanically, coupled to the light outlet region of the housing of the illumination module for coupling at least a part of the light emitted by the at least one light source.

The fiber optic assembly preferably further comprises a light outlet region, which is or can be optically and in particular mechanically coupled to the light diffuser for coupling, in particular, a part of the light coupled into the fiber optic assembly and emitted by the at least one light source into the light diffuser.

This design variant of the illumination module provides the advantage that the light source support of the illumination module need not be arranged in direct proximity to the region of the vehicle component to be illuminated optionally or as needed. Rather, it is possible to place the light source support away from the region of the vehicle component to be illuminated or highlighted, wherein the light for preferably direct illumination or highlighting of the region of the vehicle component and the signal light is then transmitted to the light diffuser with the aid of the fiber optic assembly.

In this context, it lends itself in particular that the light diffuser is or can be connected directly or indirectly, in particular indirectly via a fiber optic assembly, preferably releasably or interchangeably, to the light outlet region of the housing of the illumination module. In this way, a modular design of the illumination module is ensured, so that the illumination module can be used for different applications.

Preferably, at least one seal is provided for sealing the light outlet region of the housing against the light diffuser and/or against the fiber optic assembly, wherein the seal is in particular part of the housing, the light diffuser, and/or the fiber optic assembly.

According to a further aspect of the illumination module according to the invention, the light diffuser comprises a particularly arcuate or circular or a particularly segmented arcuate or segmented circular body having a first side region and a second side region, which is spatially separated from the former, wherein the first side region at least regionally forms the first light outlet region of the light diffuser, and the second side region at least regionally forms the second light outlet region of the light diffuser. In this design variant, it is thus conceivable that the light diffuser at least regionally surrounds or encompasses the region of the vehicle component to be illuminated or illuminated.

According to realizations of the aforementioned design variant, it is provided that the particularly arcuate or circular or a particularly segmented arcuate or segmented circular body is configured and/or aligned in view of the region of the vehicle component to be illuminated or highlighted optionally or as needed such that the light can be decoupled via the first side region of the particularly segmented arcuate or segmented circular body for preferably direct illumination or highlighting of the region of the vehicle component, and that the signal light can be decoupled via the second side region of the particularly arcuate or circular or particularly segmented arcuate or segmented circular body, in particular for indicating a state, preferably an operating state, in particular of a vehicle component, or for indicating a situation, preferably a hazardous or warning situation.

According to a further aspect, the invention relates to an illumination module for illuminating, in particular optionally or as needed, and in particular highlighting a region of a vehicle component, in particular a region of a charging or tank recess or a handle assembly, wherein the illumination module comprises the following:

a light source support, in particular in the form of a printed circuit board, having at least one light source, preferably in the form of an LED;

a housing in which the light source support having the at least one light source is received at least regionally, wherein the housing comprises at least one light outlet region, via which light emitted by the at least one light source can be decoupled from the housing; and a light diffuser optically coupled or couplable to the light outlet region of the housing.

In this context, it is provided in particular according to the invention that the light diffuser comprises a light diffuser body formed at least partially or regionally from a transparent or translucent material, which body is connected or connectable to the housing via a catch or clip connection, in particular in a releasable or interchangeable manner or preferably via an adhesive or weld connection, such that, in a connected state, the housing and the light diffuser body form a unit that is overall encapsulated and in particular sealed against dust and liquid.

Optionally, the light diffuser body can comprise a segmentation in order to divide at least one region or a surface of the light diffuser body into individual light-permeable window regions, wherein a particularly dedicated light source can be associated with each window region in order to illuminate or highlight the individual window regions independently of one another.

The light diffuser is preferably constructed of a plurality of regions and/or components which are interconnected in order to form the light diffuser, in particular with the aid of a catch or clip connection, or which are interconnected in a material-locking manner in order to form the light diffuser, in particular in an injection molding process, in particular a multi-component injection molding process.

In principle, it is conceivable in the illumination module according to the invention that the housing of the illumination module can preferably be used in particular in an edge region of the vehicle component and is particularly preferably fixable there with a catch and/or clip connection.

On the other hand, it lends itself that the light diffuser is preferably fixable via a catch and/or clip connection to the housing and in particular to the light outlet region of the housing, wherein at least one seal is provided, which is configured in order to form an overall sealed unit after fixing of the light diffuser to the housing.

According to preferred realizations, it is provided in particular that the housing comprises in particular a soft component preferably connected to the housing in a multi-component injection molding process, which, when the illumination module is used as intended, serves to seal the housing of the illumination module against a bearing structure of the vehicle component.

The light source support of the illumination module according to the invention preferably comprises a plurality of light sources, preferably each in the form of an LED. In particular, it is advantageous in this context that the individual light sources can be actuated preferably independently of one another. In particular, it is provided in this exemplary embodiment that the individual light sources have a common main radiating direction. Of course, it goes without saying that the invention is not limited to these exemplary embodiments.

For variable lighting, a segmentation is preferably associated with the light source support and/or the light diffuser.

According to further developments of the solution according to the invention, it is provided that a control device is associated with the illumination module for actuating the at least one light source of the illumination module, preferably such that the region of the vehicle component is illuminated or highlighted with the illumination module, in particular optionally or as needed. Alternatively or additionally, the at least one light source is actuated with the aid of the control device such that, in particular optionally or as needed, signal light, in particular for indicating a state, preferably an operating state, in particular of a vehicle component, or for indicating a situation, preferably a hazardous or warning situation, is output with the illumination module.

According to implementations of the last mentioned aspect, it is provided that the control device is configured in order to adjust the color, the intensity, and/or the luminous intensity of the at least one light source, in particular as a function of whether illumination light for the region of the vehicle component or signal light is to be decoupled from the respective light outlet regions of the light diffuser.

In this context, it is of course also conceivable for the control device to be configured in order to adjust a frequency of the light emitted by the at least one light source (flashing frequency) in order to output a corresponding optical signal to the user regarding the frequency.

Nevertheless, the control device should preferably be configured in order to output the signal light as a function of a state of the vehicle component. For example, in the case of a charging or tank recess, it is conceivable for the signal light to indicate when the charging plug is inserted and secured or when the charging plug is not inserted or not inserted correctly.

Additionally, it is conceivable that a plurality of light sources, for example, are actuated with the aid of the control device when, for example, the charging plug is not yet inserted and the light intensity to be decoupled from the light diffuser, in particular via the first light outlet region, must be correspondingly high in order to ensure good highlighting or illumination of the vehicle component. On the other hand, when an illumination or highlighting of the region of the vehicle component is no longer required, for example when the charging plug is inserted and secured, a number of the actuated light sources can be reduced with the aid of the control device, because the intensity of the signal light is less than the intensity of the light for illuminating or highlighting the region of the vehicle component.

According to preferred realizations of the illumination module, a plurality of light sources are arranged on the light source support. At least one light source serves in order to output corresponding light for preferably direct illumination or highlighting of the region of the vehicle component, wherein this light source is arranged in view of the light diffuser such that the light emitted by the light source is at least largely conducted through the light diffuser to the first light outlet region of the light diffuser.

In this context, it is particularly conceivable that at least one further light source is used, in particular, for the output of signal light and is arranged on the light source support in view of the light diffuser in such a way that the light emitted by this light source is conducted by the light diffuser at least largely to the second light outlet region of the light diffuser.

A switching device, in particular in the form of a microswitch, can also be associated with the illumination module and is in particular indirectly actuable via a flexible region, in particular of the housing, which device is arranged in particular on the light source support of the illumination module or connected thereto, and which is further particularly preferably configured in order to indicate, change, or at least influence a state, preferably an operational state of a charging system, when the switching device is actuated.

The invention further relates to a vehicle component, in particular in the form of a charging or tank recess or in the form of a handle assembly, wherein the vehicle component comprises an illumination module of the previously described type, which preferably releasably or interchangeably connected to the bearing structure of the vehicle component.

In this context, it is particularly conceivable that a switching device, in particular in the form of a microswitch, is associated with the vehicle component, said device being arranged in particular on the light source support of the illumination module preferably connected thereto by way of signal technology. This switching device is in particular configured in order to change or at least influence a state, in particular an operating state, of a charging system and/or the at least one light source upon actuation of the switching device.

BRIEF DESCRIPTION OF THE DRAWINGS

Exemplary embodiments of the solution according to the invention are described in further detail below with reference to the accompanying drawings.

The following are shown.

DETAILED DESCRIPTION

Figure 1:
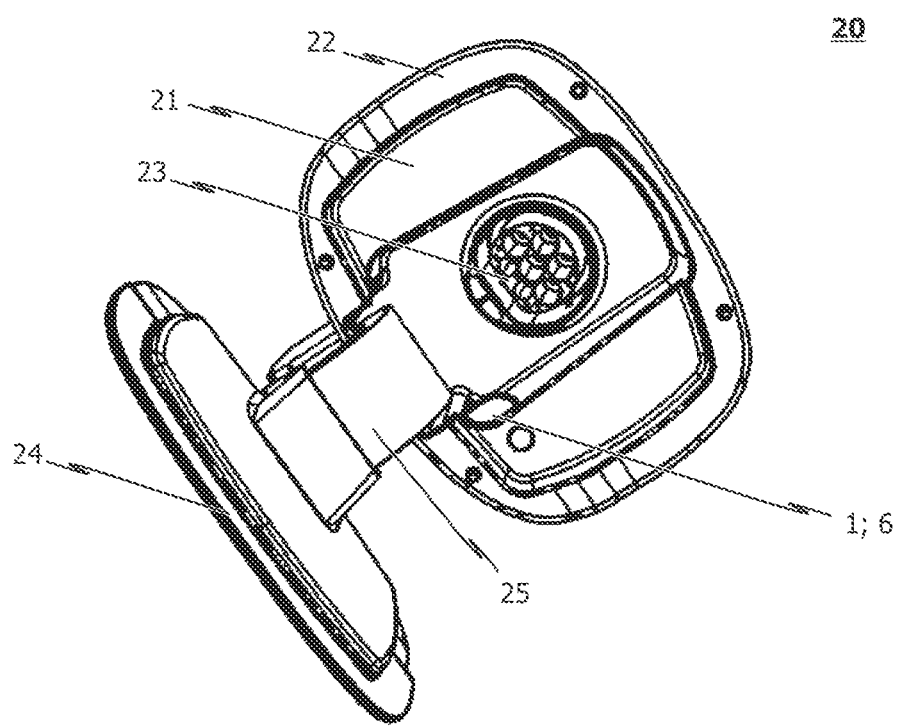
FIG. 1 shows schematically and in an isometric view, an exemplary embodiment of the vehicle component according to the invention (here: charging or tank recess) in a top plan view, wherein an exemplary embodiment of the illumination module according to the invention is integrated in the charging or tank recess.

Unless otherwise indicated, the same reference numerals in the figures refer to the same objects.

The charging or tank recess 20 shown in FIG. 1 is preferably made of plastic and is formed as a whole in a bowl-like shape. The charging or tank recess 20 comprises an outer edge 22, which is specified by a recess body 21, by means of which the charging or tank recess 20 can be inserted into a body opening of a motor vehicle, for example clipped into place. Corresponding snaps (clips) can thus preferably be integrally formed on the recess body 21 in order to secure the charging or tank recess 20 to the body opening, in particular a body deep-draw.

A sealing region is preferably provided on the outer edge 22 of the recess body 21, which can comprise a circumferential sealing lip formed on the outer edge 22. Instead of such a sealing lip, however, it is also conceivable to design a plurality of sealing blades on the outer edge 22, which are respectively separated from one another at regular circumferential distances by a slot.

In the inner recess region of the charging or tank recess 20, a passage opening is formed in which a charging connector 23 is inserted for charging a battery of the motor vehicle or a tank opening or tank filling tube for fueling a fuel tank.

A closure flap 24 is hinged to the outer recess body 21, via which the charging or tank recess 20 can be optionally closed or released. The closure flap 24 is in particular a charging or tank flap arranged with a hinge arm 25 on the outer recess body 21, such that the charging or tank flap is movable, in particular hinged or foldable, relative to the charging or tank recess 20.

On the side of the charging or tank recess 20 opposite the hinge arm 25, an opening and closing mechanism can be arranged, which can have a push-push kinematics acting in the direction of the longitudinal axis of the charging or tank recess 20, i.e. the direction of actuation of the push-push kinematics occurs the direction of the longitudinal axis. By a force exerted on the opening and closing mechanism in the direction of the longitudinal axis, the mechanism can be unlocked and the charging or tank flap can be opened or unfolded, or the folded charging or tank flap can be locked.

In the charging or tank recess 20 shown in FIG. 1, an illumination device is provided, which is formed by an illumination module 1. In the top plan view of the (opened) charging or tank recess 20 selected in FIG. 1, only a region of the light diffuser 6 of the illumination module 1 can be discernible.

Details of the illumination module 1 used in the charging or tank recess 20 as shown in FIG. 1 are described in further detail below with reference to the illustrations in FIG. 2 to FIG. 9.

The illumination module 1 serves in particular for optional or as-needed illumination and in particular highlighting of a region of the charging or tank recess 20 and simultaneously for in particular optional or as-needed output of optical signals for the operator or user.

Figure 2:
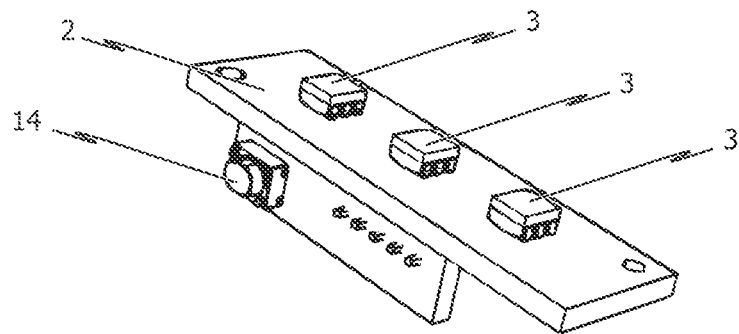
FIG. 2 shows schematically and in an isometric view, a light source support of an exemplary embodiment of the illumination module according to the invention having a total of three light sources, each in the form of an LED, as well as a microswitch.
Figure 3:
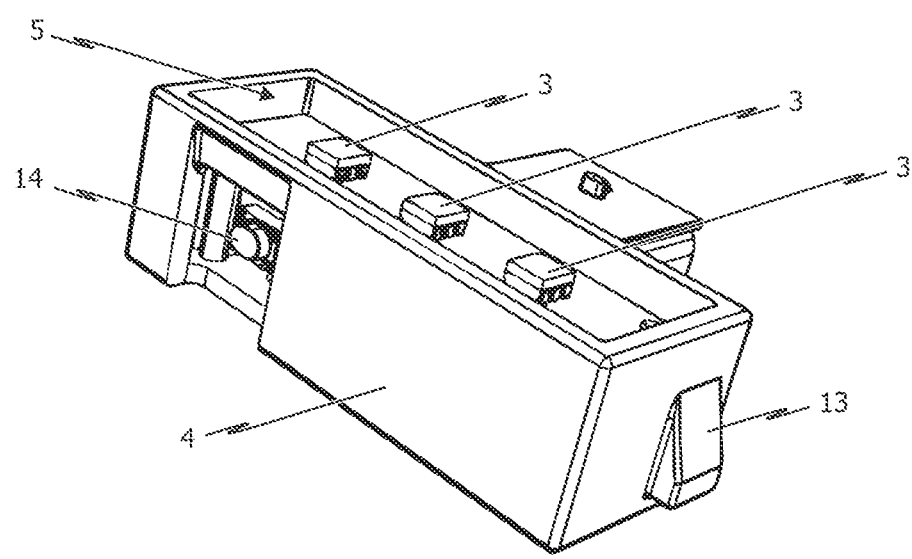
FIG. 3 shows schematically, and in an isometric view, the light source support according to FIG. 2 in a state having been received at least regionally in the housing of the illumination module.

As can be seen in the illustrations in particular in FIG. 2 and FIG. 3, the illumination module 1 substantially comprises a light source support 2, for example in the form of a printed circuit board. At least one light source 3 (in the embodiment shown in the drawings, a total of three light sources 3) is preferably arranged on the light source support 2 in the form of an LED.

Furthermore, a switching device in the form of a microswitch 14 can be arranged on the light source support 2.

The light source support 2 preferably additionally comprises a control device, for example in the form of a microchip, for example in order to actuate the light source 3 appropriately and in particular to also react accordingly to a particularly manual actuation of the switching device 14.

The illumination module 1 further comprises a housing 4, as can be seen from the schematic illustration in FIG. 3. In the housing 4, the light source support 2 with the light sources 3 is at least regionally received.

It can further be seen in the illustration in FIG. 3 that the housing 4 comprises a light outlet region 5 via which light emitted by the light sources 3 can be decoupled from the housing 4.

On side walls of the housing 4, corresponding latch tabs 13 can be configured so that the housing 4 of the illumination module 1 can be connected to the charging or tank recess 20. In particular, it can be provided in this context that the housing 4 of the illumination module 1 can be inserted in particular into an edge region of the charging or tank recess 20 and can preferably be fixed there with a catch and/or clip connection.

The housing 4 of the illumination module 1 is preferably formed from a plastic material. In particular, it lends itself here to form the housing 4 as part of an injection molding process.

Figure 4:
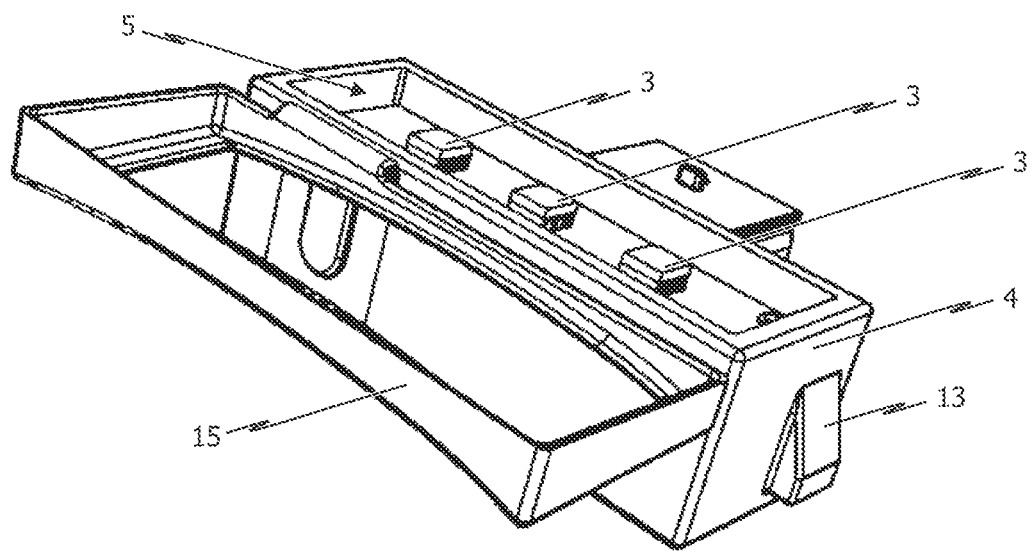
FIG. 4 shows schematically and in an isometric view, the light source support according to FIG. 3, wherein a soft component for sealing the housing against a bearing structure of the vehicle component is integrally formed on the housing of the illumination module.

Preferably, the housing 4 is formed in a multi-component injection molding process in order to simultaneously connect a soft component 15 to the housing 4, as indicated in FIG. 4. This soft component 15 can then be pivoted by 180° to the edge region of the light outlet region 5 of the housing 4 (cf. FIG. 5) and, when the illumination module 1 is used as intended, serves to seal the housing 4 against a bearing structure of the charging or tank recess 20.

Figure 5:
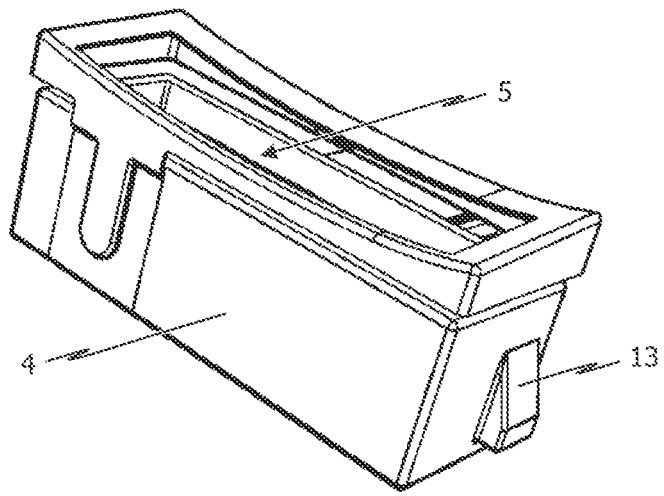
FIG. 5 shows schematically and in an isometric view, the housing of the illumination module having the light source support according to FIG. 4 received at least regionally in the housing, wherein the soft component formed on the housing is hinged to the edge region of the housing that bounds the light outlet region.
Figure 6:
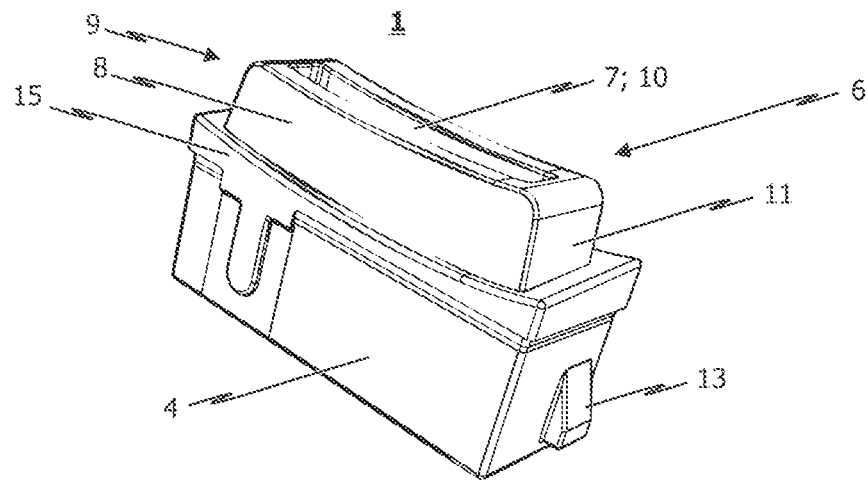
FIG. 6 shows a first exemplary embodiment of the illumination module according to the invention consisting of the housing having the light source support according to FIG. 5 as well as a light diffuser optically and mechanically coupled to the light outlet region of the housing.

A first exemplary embodiment of the illumination module 1 according to the present invention is shown in FIG. 6, wherein this illumination module 1 comprises the housing 4 having the light source support 2 and the light sources 3 previously described with reference to the illustrations in FIG. 3 to FIG. 5.

As can be seen from FIG. 6, in this exemplary embodiment, it is provided that a light diffuser 6 is optically coupled to the light outlet region 5 of the housing 4. The light diffuser 6 is preferably arranged interchangeably with the housing 4 of the illumination module 1 at the light outlet region 5 of the housing 4.

The light diffuser 6 is characterized in that it has a first light outlet region 7, which is aligned in the direction of the region of the charging or tank recess 20 to be illuminated or highlighted. Via this first light outlet region 7, light can be decoupled for preferably direct illumination or highlighting of the region of the charging or tank recess 20.

In addition to the first light outlet region 7, the light diffuser 6 also comprises a second light outlet region 8, which is in particular spatially separated from the former. The second light outlet region 8 serves to decouple signal light, in particular in order to indicate a state, preferably an operating state, of the charging or tank recess 20, or to indicate a situation, for example a hazardous or warning situation.

The light diffuser 6 preferably comprises an optical diffusion or deflection device, which is configured in order to decouple a first portion of the light emitted by the light source 3 and coupled at the light outlet region 5 of the housing 4 into the light diffuser 6 via the first light outlet region 7 of the light diffuser 6 as illumination light for the region of the charging or tank recess 20, and to decouple a second portion of the light emitted by the light sources 3 and coupled to the light outlet region 5 of the housing 4 into the light diffuser 6 via the second light outlet region 8 of the light diffuser 6 as corresponding signal light.

Various solutions come into question for the dividing of the light emitted by the light sources 3 and coupled to the light outlet region 5 of the housing 4 into the light diffuser 6.

It is conceivable, for example, that the light sources 3 are arranged in particular separate from one another, such that at least a first light source 3 emits light such that it is coupled into a central region of the light diffuser 6 and is decoupled via the first light outlet region 7 of the light diffuser 6 as illumination light for the region of the charging or tank recess 20, while at least one second light source 3 emits light such that it is at least partially coupled to an edge region of the light diffuser 6 and then decoupled as signal light via the second light outlet region 8 of the light diffuser 6.

By using the control device to suitably actuate the at least one first light source 3 and/or the at least one second light source 3, light can be selectively decoupled as illumination light via the first light outlet region 7 of the light diffuser 6 and/or as signal light over the second light outlet region 8 of the light diffuser 6.

Because, for the illumination or highlighting of the region of the charging or tank recess 20, the light intensity to be decoupled via the first light outlet region 7 of the light diffuser 6 should be higher than the light intensity of the light to be decoupled via the second light outlet region 8 of the light diffuser 6 as signal light, the first portion and the second portion of the light emitted by the light sources 3 and coupled at the light outlet region 5 of the housing 4 into the diffuser 6 should be accordingly determined or determinable in advance.

In the first exemplary embodiment of the illumination module 1 according to the invention shown in FIG. 6, it is provided that the light diffuser 6 comprises a body 9 formed in particular of a transparent or translucent material, at least regionally, which comprises a particularly material-free passageway 10. Through this particularly material-free passageway 10, the light is conducted for preferably direct illumination or highlighting of the region of the charging or tank recess 20.

As indicated in FIG. 6, the body 9 formed in particular from a transparent or translucent material, at least regionally, comprises a corresponding side wall 11, wherein a region of the side wall 11 serves as a second light outlet region 8 for decoupling signal light.

In this context, it is particularly conceivable to design the body 9, which is particularly formed from a transparent or translucent material, such that the light coupled to the wall region 11 of the body 9 is transported by Total Internal Reflection (TIR).

Corresponding impurities can be generated in the region forming the second light outlet region 8 of the light diffuser 6 for the signal light to be decoupled, wherein the TIR condition is prevented at these impurities or by these impurities, and the light coupled to the wall region 11 of the body 9 is at least partially decoupled as signal light. Various methods are considered for generating such impurities, for example a storage of optical scattering centers or a roughening of the surface of the side wall 11, for example by sandblasting.

The light diffuser 6 is preferably releasably and in particular interchangeably connectable to the light outlet region 5 of the housing 4.

Figure 7:
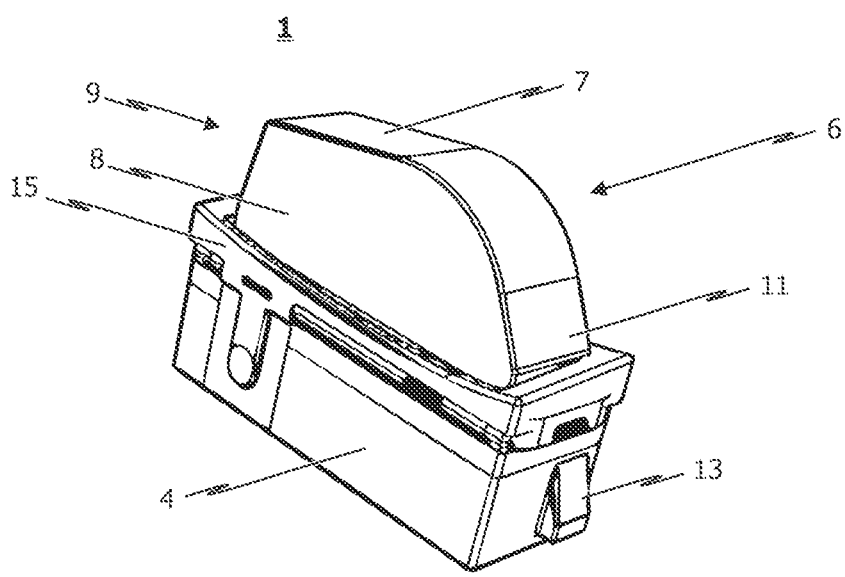
FIG. 7 shows schematically and in an isometric view, a second exemplary embodiment of the illumination module according to the invention consisting of the housing having the light source support according to FIG. 5 as well as a light diffuser optically and mechanically coupled to the light outlet region of the housing.

In FIG. 7, a further embodiment of the illumination module 1 according to the invention is shown. This illumination module 1 substantially corresponds to the first exemplary embodiment according to FIG. 6, wherein, however, the light diffuser 6 optically coupled to the light outlet region 5 of the housing 4 is slightly changed.

Specifically, the light diffuser 6 used in the illumination module 1 according to FIG. 7 has a different configuration and orientation of the first and second light outlet regions 7, 8.

In particular, however, the light diffuser 6 used in the illumination module 1 according to FIG. 7 differs from the light diffuser 6 of the embodiment according to FIG. 6 in that the wall region 11 of the light diffuser 6 is designed to be longer. In this way, the path of the light in the light diffuser 6 is extended, which leads to a stronger homogenization of the light emitted in particular via the second light region 8.

In the embodiment shown in FIG. 7, it is also provided that the light diffuser 6 is formed from a solid body 9. This body 9 consists of a transparent material and is configured in order to conduct light via the light outlet region 5 of the housing 4 to the first light outlet region 7 by Total Internal Reflection (TIR) and to decouple it there.

As the material for the body 9 of the light diffuser 6, transparent PMMA or polycarbonate is considered, in particular.

By regionally activating the side wall 11 of the light diffuser body 9, for example by roughening of the side wall 11, the TIR condition is prevented and the light previously coupled via the light outlet region 5 of the housing 4 is at least partially decoupled as signal light.

Figure 8:
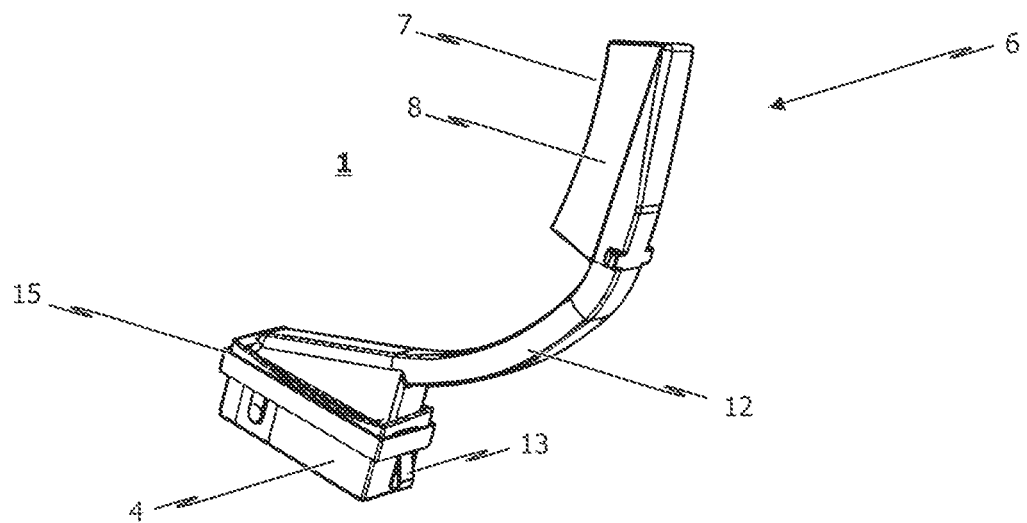
FIG. 8 shows schematically and in an isometric view, a third exemplary embodiment of the illumination module according to the invention consisting of the housing having the light source support according to FIG. 5 and a light diffuser optically coupled to the light outlet region of the housing of the illumination module via a fiber optic assembly.

In FIG. 8, a third exemplary embodiment of then illumination module 1 according to the invention is shown.

Like the first and second embodiment of the illumination module 1, in the third embodiment, the housing 4 having the light source support 2 according to FIG. 5, for example, is used. However, by contrast to the first and second embodiment of the illumination module 1 according to FIG. 6 and according to FIG. 7, in the third embodiment of the module 1, it is provided that the light diffuser 6 is not directly connected to the light outlet region 5 of the housing 4.

Rather, in the third embodiment of the illumination module 1 according to the invention, the light diffuser 6 is optically and mechanically connected to the light outlet region 5 of the housing 4 via a fiber optic assembly 12. The light decoupled at the light outlet region 5 of the housing 4 is conveyed to the light inlet region of the light diffuser 6 via the fiber optic assembly 12.

Figure 9:
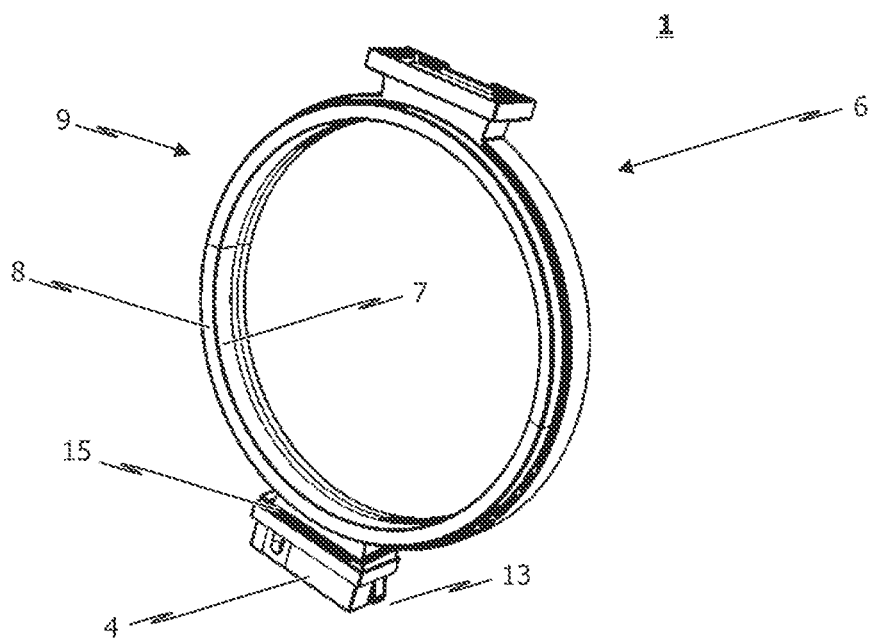
FIG. 9 shows schematically and in an isometric view, a fourth exemplary embodiment of the illumination module according to the invention consisting of a housing having a light source support according to FIG. 5 and an arc-shaped or circular light diffuser optically coupled to the light outlet region of the housing.

In FIG. 9, a further (fourth) exemplary embodiment of the illumination module 1 according to the invention is shown. In this embodiment, a housing 4 having a corresponding light source support 2 is again used, as has been described above, in particular with reference to the illustrations in FIG. 2 to FIG. 5.

In the fourth exemplary embodiment of the illumination module 1 according to the invention shown in FIG. 9, a light diffuser 6 is connected to the light outlet region 5 of the housing 4 and has an arcuate or circular body. The arcuate or circular body comprises a first side region, which at least regionally forms the first light outlet region 7 of the light diffuser 6, and a second side region, which at least regionally forms the second light outlet region 8 of the light diffuser 6.

As indicated in FIG. 8, it is also conceivable in this context that a plurality of housings 4 having corresponding light source supports 2 can be connected to the arcuate or circular body.

The control device associated with the illumination module 1 is in particular configured in order to actuate the light sources 3 of the illumination module 1 such that the lighting parameters of the light sources 3 can be changed, in particular as a function of a state of charge of the motor vehicle battery and/or as a function of a state of the charging connector or tank filler tube and/or as a function of a tank fill level.

The lighting parameters, which can be changed with the aid of the control device associated with the illumination module 1, are in particular a wavelength (color) of the light emitted by the light source 3, an intensity (brightness) of the light emitted by the light source 3, a flashing frequency of the light emitted by the light source 3, and/or a pulse shape and/or pulse frequency of the light emitted by the light sources 3.

For example, it is conceivable that, in a state when a closure member (such as a closure flap 24) associated with the charging or tank recess 20 is opened, the control device actuates the light sources 3 of the illumination module 1 in such a way that white light is emitted from the light sources 3 and preferably as illumination light, so as to permit a particularly optimal highlighting of at least one region of the inner recess region of the charging or tank recess 20.

It is further conceivable that the control device actuates the light sources 3 of the illumination module 1 such that at least one light source 3 emits the light at a particular flashing frequency when, with the aid of a suitable sensor system, it is detected that a charging connector 23 or a tank filling tube is not or not properly accommodated in the passage opening or in a charging port or tank opening of the charging or tank recess 20 received in the passage opening.

It is further conceivable that the control device changes the wavelength (color) of the light emitted by the light sources 3 as a function of a charging state of the battery sensed with the aid of a corresponding sensor system or as a function of a filling level of a (fuel) tank sensed with the aid of a corresponding sensor system.

Of course, other display options are also conceivable. It is significant in this context that the illumination module 1 not only serves to highlight a region of the vehicle component, such as the inner recess region of the charging or tank recess 20, but can simultaneously function as a charging indicator light, status indicator light, tank level indicator light, etc.

In this way, the illumination module 1 takes on a plurality of additional functions so that separate display devices, in particular separate charging or tank level indicator lights, can be omitted.

Figure 10:
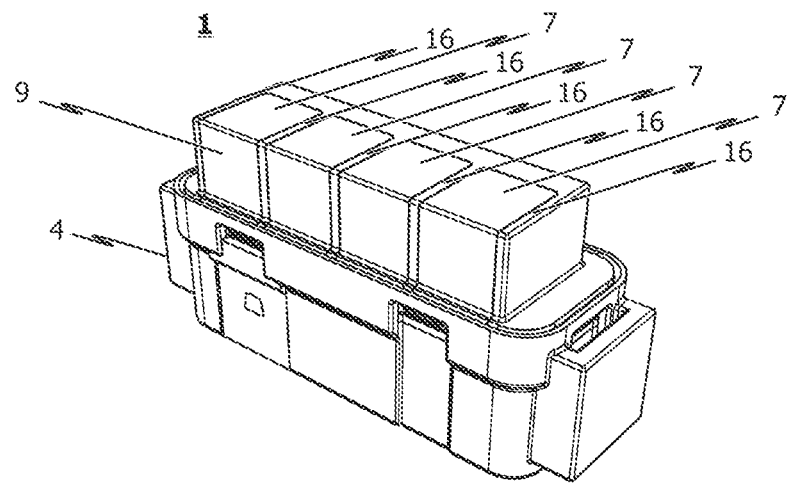
FIG. 10 shows schematically and in an isometric view, a fifth exemplary embodiment of the illumination module according to the invention consisting of the housing having a light source support as well as a light diffuser optically and mechanically coupled to the light outlet region of the housing.

In FIG. 10, schematically and in an isometric view, a further exemplary embodiment of the illumination module 1 according to the present invention is shown, wherein the illumination module 1 comprises a housing 4 having a light source support not seen in FIG. 10 and a plurality of light sources.

As can be seen from FIG. 10, in this exemplary embodiment, it is also provided that a light diffuser 6 is optically coupled to the light outlet region of the housing 4. The light diffuser 6 is preferably interchangeably fixed to the housing 4 of the illumination module 1 at the light outlet region of the housing 4 via a catch or clip connection, so that a sealed (encapsulated) unit is formed overall. For this purpose, corresponding seals are preferably provided or arranged on the housing 4 and/or on the light diffuser 6, in particular integrally formed in the course of a multi-component injection molding process.

Figure 11:
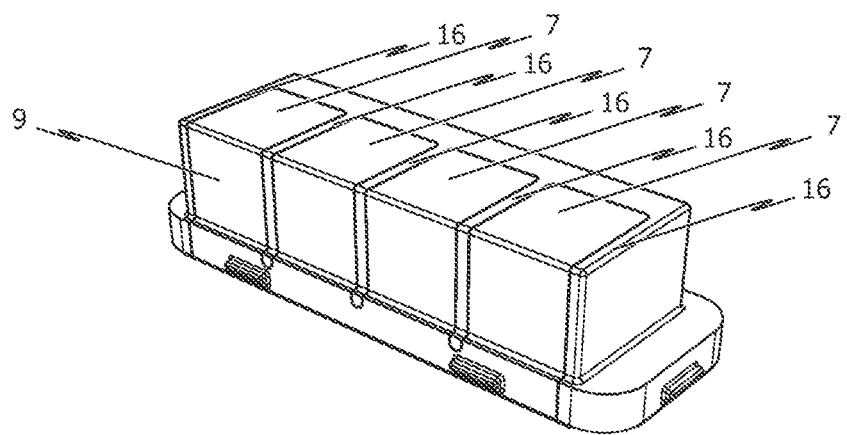
FIG. 11 shows schematically and in an isometric view, the light diffuser of the illumination module according to FIG. 10.

The light diffuser 6 of this design variant is shown separately in FIG. 11 and is characterized by having a first light outlet region 7, which is aligned in the direction of the region of the charging or tank recess 20 to be illuminated or highlighted. Via this first light outlet region 7, light can be decoupled for preferably direct illumination or highlighting of the region of the charging or tank recess 20.

Figure 12:
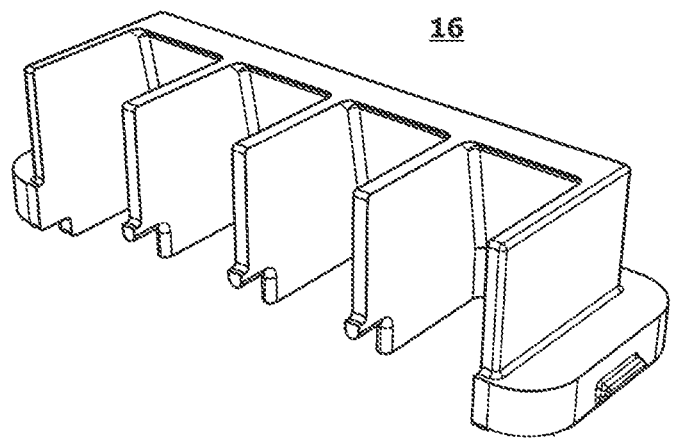
FIG. 12 shows schematically and in an isometric view, the segmentation of the light diffuser according to FIG. 11.
Figure 13:
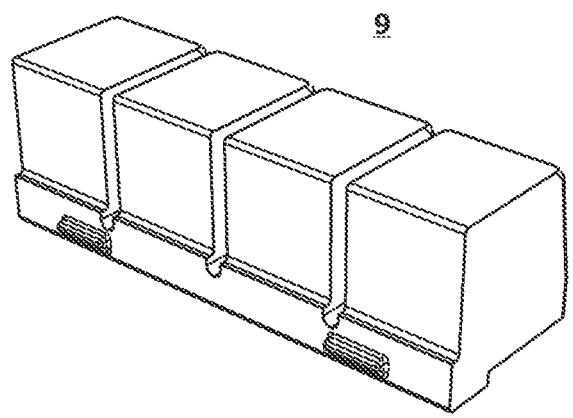
FIG. 13 shows schematically and in an isometric view, the light diffuser of FIG. 11 without the segmentation according to FIG. 12.

The light diffuser 6 preferably comprises a segmentation 16, via which the light emitted by the light sources is spatially separated. The segmentation 16 and the illumination body or light diffuser body 9 of the light diffuser 6 are shown separately in FIG. 12 and FIG. 13.

Overall, the illumination module 1 is thus characterized by its compact design, wherein several additional functions can nevertheless be implemented.

It should be noted at this point that the present invention is not limited to the use of the illumination module 1 in charging or tank recesses 20. Rather, the illumination module 1 according to the invention is suitable for different vehicle components, for example also for optional illumination of a handle arrangement or for displaying optical information for such a handle arrangement.

In particular, the invention is not limited to the embodiments shown in the drawings, but rather results when all of the features disclosed herein are considered together.

LIST OF REFERENCE NUMERALS

1 Illumination module
2 Light source support
3 Light source
4 Housing
5 Light outlet region of the housing
6 Light diffuser
7 First light outlet region of the light diffuser
8 Second light outlet region of the light diffuser
9 Light diffuser body
10 Passageway in the light diffuser body
11 Side wall of the light diffuser body
12 Fiber optic assembly
13 Catch/clip connection or catch/clip connecting means
14 Microswitch
15 Soft component
16 Segmentation
20 Charging or tank recess
21 Recess body
22 Outer edge of the recess body
23 Charging connector
24 Closure flap
25 Hinge arm

The invention claimed is:

1. An illumination module for illuminating a region of a vehicle component, wherein the illumination module comprises:
    a light source support, in the form of a printed circuit board, having at least one light source;
    a housing in which the light source support having the at least one light source is received at least regionally, wherein the housing comprises at least one light outlet region, via which light emitted by the at least one light source is decoupled from the housing; and
    a light diffuser optically coupled or couplable to the light outlet region of the housing,
    wherein
    the at least one light source comprises a first light source;
    the light diffuser comprises a first light outlet region, via which light is decoupled for direct illumination or highlighting of the region of the vehicle component and which comprises a second light outlet region, spatially separated from the first light outlet region, via which signal light is decoupled, for indicating a state or for indicating a situation;
    wherein the first light outlet region is defined in part by a first external surface portion of the light diffuser that faces in a first direction away from the housing, and the second light outlet region is defined in part by a second external surface portion of the light diffuser that faces in a second direction to one side of the housing, the second external surface portion angularly intersecting the first external surface portion;
    wherein a first portion of light emitted by the first light source is coupled directly to the first light outlet region and a second portion of light emitted by the first light source is coupled directly to the second light outlet region;
    wherein the at least one light source further comprises a second light source and a third light source, wherein the first, second and third light sources have a common main radiating direction, and wherein a segmentation is associated with the light source support or the light diffuser such that each of the first light source, the second light source and the third light source decouple light from different portions of the light diffuser.

2. The illumination module according to claim 1,
    wherein a material surface roughness, of an at least regionally transparent or translucent element associated with the first light outlet region is different from a material surface roughness, of an at least regionally transparent or translucent element associated with the second light outlet region.

3. The illumination module according to claim 1,
    wherein at least some light decoupled via the first light outlet region or the second light outlet region is light that is emitted via the first light source and directed against at least one interior wall region of the housing, the at least one interior wall region having a degree of remission of at least 75%.

4. The illumination module according to claim 1
    wherein the first portion corresponds to a luminous flux, which is greater than the luminous flux corresponding to the second portion.

5. The illumination module according to claim 1,
    wherein the first light source is a first LED and the second light source is a second LED, wherein the first light source and the second light source are actuable independently of one another.

6. The illumination module according to claim 1, wherein the light diffuser directly or indirectly, is releasably or interchangeably connected to the light outlet region of the housing of the illumination module, wherein a seal is provided for sealing the light outlet region of the housing against the light diffuser, wherein the seal is part of the housing or the light diffuser.

7. The illumination module according to claim 1,
    wherein the light diffuser comprises a light diffuser body formed at least partially or regionally from a transparent or translucent material, which body is connected or connectable to the housing via a catch or clip connection, in a releasable or interchangeable manner or via an adhesive or weld connection, such that, in a connected state, the housing and the light diffuser body form a unit that is overall encapsulated and sealed against dust and liquid.

8. The illumination module according to claim 1,
    wherein the housing of the illumination module is inserted into an edge region of the vehicle component and is releasably fixed there via a catch or clip connection.

9. The illumination module according to claim 1,
    wherein a switching device, in the form of a microswitch, is associated with the illumination module and is indirectly actuable via a flexible region of the housing, which device is arranged on the light source support of the illumination module or connected thereto, and which is further configured in order to indicate, change, or at least influence an operational state of a charging system, when the switching device is actuated.

10. A vehicle component, in the form of a charging or tank recess or in the form of a handle assembly, wherein the vehicle component comprises an illumination module according to claim 1 connected the vehicle component.

11. An illumination module for illuminating a region of a vehicle component, wherein the illumination module comprises:
a printed circuit board, having a first light source and a second light source supported thereon;
a housing in which the printed circuit board is at least partly received, wherein the housing comprises at least one light outlet region, via which light emitted by the first light source and the second light source is decoupled from the housing; and
a light diffuser optically coupled to the light outlet region of the housing,
wherein the light diffuser comprises a first light outlet region, via which light is decoupled for direct illumination or highlighting of the region of the vehicle component, and a second light outlet region, spatially separated from the first light outlet region, via which signal light is decoupled, for indicating a state or for indicating a situation;
wherein a first portion of light emitted by the first light source is coupled directly to the first light outlet region and a second portion of light emitted by the first light source is coupled directly to the second light outlet region;
wherein the light diffuser further comprises a third light outlet region, via which light is decoupled for direct illumination or highlighting of the region of the vehicle component, and a fourth light outlet region, spatially separated from the third light outlet region, via which signal light is decoupled, for indicating the state or for indicating the situation;
wherein a first portion of light emitted by the second light source is coupled directly to the third light outlet region and a second portion of light emitted by the second light source is coupled directly to the fourth light outlet region;
wherein a segmentation wall separates the first and second light outlet regions from the third and fourth light outlet regions.

12. The illumination module of claim 11, wherein the segmentation wall is part of a segmentation structure that is attached to the housing, and wherein the light diffuser is coupled to both the housing and the segmentation wall structure.

13. The illumination module of claim 11, further comprising:
a microswitch actuable via a flexible region of the housing, wherein actuation of the microswitch effects an illumination state of both the first light source and the second light source.

14. An illumination module for illuminating a region of a vehicle component, wherein the illumination module comprises:
a light source support, in the form of a printed circuit board, having at least one light source;
a housing in which the light source support having the at least one light source is received at least regionally, wherein the housing comprises at least one light outlet region, via which light emitted by the at least one light source is decoupled from the housing; and
a light diffuser optically coupled or couplable to the light outlet region of the housing,
wherein
the at least one light source comprises a first light source;
the light diffuser comprises a first light outlet region, via which light is decoupled for direct illumination or highlighting of the region of the vehicle component and which comprises a second light outlet region, spatially separated from the first light outlet region, via which signal light is decoupled, for indicating a state or for indicating a situation;
wherein the first light outlet region is defined in part by a first external surface portion of the light diffuser that faces in a first direction away from the housing, and the second light outlet region is defined in part by a second external surface portion of the light diffuser that faces in a second direction to one side of the housing, the second external surface portion angularly intersecting the first external surface portion;
wherein a first portion of light emitted by the first light source is coupled directly to the first light outlet region and a second portion of light emitted by the first light source is coupled directly to the second light outlet region;
wherein a switching device, in the form of a microswitch, is associated with the illumination module and is indirectly actuable via a flexible region of the housing, the switching device is arranged on the light source support of the illumination module or connected thereto, and the switching device is further configured in order to indicate, change, or influence an operational state of a charging system, when the switching device is actuated.

* * * * *